(12) United States Patent
Richman et al.

(10) Patent No.: US 10,367,679 B2
(45) Date of Patent: *Jul. 30, 2019

(54) OPTIMIZING DATA MIGRATION PROCESSES

(71) Applicant: SKYKICK, INC., Seattle, WA (US)

(72) Inventors: Evan Richman, Seattle, WA (US); Todd Schwartz, Seattle, WA (US); Trent Robert Schwartz, Seattle, WA (US); Bradley Younge, Denver, CO (US); Alexander Samuel-Charles Barclay, Tacoma, WA (US)

(73) Assignee: SKYKICK, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,460

(22) Filed: Jun. 28, 2018

(65) Prior Publication Data

US 2018/0324028 A1 Nov. 8, 2018

Related U.S. Application Data

(63) Continuation of application No. 14/872,984, filed on Oct. 1, 2015, now Pat. No. 10,027,738.
(Continued)

(51) Int. Cl.
| | |
|---|---|
| G06F 15/16 | (2006.01) |
| H04L 12/24 | (2006.01) |
| H04L 29/08 | (2006.01) |
| H04L 12/58 | (2006.01) |
| G06F 16/83 | (2019.01) |

(Continued)

(52) U.S. Cl.
CPC .......... *H04L 41/046* (2013.01); *G06F 16/214* (2019.01); *G06F 16/83* (2019.01); *H04L 51/14* (2013.01); *H04L 51/22* (2013.01); *H04L 63/0876* (2013.01); *H04L 67/06* (2013.01); *H04L 67/10* (2013.01); *H04L 67/1095* (2013.01); *H04L 67/141* (2013.01);
(Continued)

(58) Field of Classification Search
CPC .... H04L 67/06; H04L 51/14; G06F 17/30923
USPC .................................................. 709/202–203
See application file for complete search history.

(56) References Cited

U.S. PATENT DOCUMENTS

| | | | |
|---|---|---|---|
| 6,735,691 B1 | 5/2004 | Capps et al. | |
| 7,210,131 B2 | 4/2007 | Schmidt et al. | |

(Continued)

OTHER PUBLICATIONS

U.S. Appl. No. 14/872,984, "Non-Final Office Action", dated Sep. 12, 2017, 12 pages.
(Continued)

*Primary Examiner* — Duyen M Doan
(74) *Attorney, Agent, or Firm* — Kilpatrick Townsend & Stockton LLP (57) ABSTRACT

Systems, methods, and apparatuses can present optimized data migration. Embodiments can provide improved data migration processes using a data migration assistant that executes on a source system to facilitate the migration of documents and data to a destination system. The migration assistant can communicate with a migration controller server to authenticate and identify the migration assistant and migration project that the migration assistant is to be used for. The migration controller server can use the identifier to determine commands corresponding to the migration project to send to the migration assistant to collect data and make changes to the source system.

19 Claims, 8 Drawing Sheets

Related U.S. Application Data (60) Provisional application No. 62/058,605, filed on Oct. 1, 2014.

(51) Int. Cl.
  *G06F 16/21* (2019.01)
  *H04L 29/06* (2006.01)

(52) U.S. Cl.
  CPC .......... *H04L 67/146* (2013.01); *H04L 63/083* (2013.01); *H04L 63/104* (2013.01)

(56) References Cited

U.S. PATENT DOCUMENTS

| | | | |
|---|---|---|---|
| 7,440,887 B2 | 10/2008 | Soulet | |
| 8,515,919 B1 | 8/2013 | Patwardhan et al. | |
| 8,874,628 B1* | 10/2014 | Lanzatella | G06F 17/00 707/651 |
| 9,081,510 B2 | 7/2015 | Green et al. | |
| 9,116,777 B1 | 8/2015 | Kiradjiev et al. | |
| 9,529,828 B1* | 12/2016 | Schwartz | H04L 67/1097 |
| 9,654,436 B2 | 5/2017 | Greinhofer et al. | |
| 2006/0112172 A1* | 5/2006 | Isaac | G06Q 10/107 709/218 |
| 2007/0150488 A1 | 6/2007 | Barsness et al. | |
| 2011/0004629 A1 | 1/2011 | Thorat et al. | |
| 2012/0185926 A1* | 7/2012 | Topatan | H04L 51/22 726/7 |
| 2013/0124674 A1 | 5/2013 | Matsumoto et al. | |
| 2013/0212200 A1* | 8/2013 | Dennis | H04L 51/22 709/206 |
| 2013/0290542 A1* | 10/2013 | Watt | H04L 51/22 709/226 |
| 2014/0149517 A1 | 5/2014 | Greinhofer et al. | |
| 2015/0026127 A1 | 1/2015 | Zachrisen et al. | |
| 2015/0100655 A1 | 4/2015 | Pouzin et al. | |
| 2015/0178014 A1 | 6/2015 | Nelson | |
| 2015/0268876 A1* | 9/2015 | Ahn | G06F 3/0619 711/162 |
| 2016/0041995 A1* | 2/2016 | Prinz, III | G06F 16/119 707/694 |
| 2016/0099998 A1 | 4/2016 | Richman et al. | |

OTHER PUBLICATIONS

U.S. Appl. No. 14/872,984, "Notice of Allowance", dated Mar. 22, 2018, 9 pages.

Chen et al., "An Automatic Network Live Migration Mechanism for Cloud Computing", Chen, Min-Xiou, et al., "An Automatic Network Live Migration Mechanism for Cloud Computing," 3rd International Conference on Computer Science and Service System (CSSS 2014), 1 page Abstract.

Kazzaz et al., "A Web Service Migration Framework," ICIW 2013, The Eighth International Conference on Internet and Web Applications and Services.

\* cited by examiner

OPTIMIZING DATA MIGRATION PROCESSES

CROSS-REFERENCES TO RELATED APPLICATIONS

The present application is a continuation of U.S. application Ser. No. 14/872,984, entitled "Optimizing Data Migration Processes," filed Oct. 1, 2015, which is non-provisional of and claims priority to U.S. Provisional Application 62/058,605, entitled "Optimizing Data Migration Processes," filed on Oct. 1, 2014. The present application is also related to U.S. Provisional Application 62/058,608, entitled "Automated Staged Data Migrations," filed on Oct. 1, 2014, and to concurrently filed U.S. patent application entitled "Automated Staged Data Migrations," which claims priority to U.S. Provisional Application 62/058,605. The entire content of the above applications are hereby incorporated by reference for all purposes in its entirety.

BACKGROUND

The present disclosure relates to collecting and packaging data from a source system and sending commands to the source system to optimize data migration from the source system.

Migration of data from a source system to a destination system is fraught with cost and obstacles. For example, those who are tasked with carrying out the migration (referred to as "partners") sometimes fail to follow instructions, miss alerts, and/or simply carry out the migration steps incorrectly. Any of these events can have negative effects on a migration, resulting in lost data and additional expenses of money, man-hours, and system resources. Other problems exist with respect to characteristics and features of the source system that may be useful in some scenarios, but may also inhibit data migration.

Therefore, it is desirable to provide solutions that improve migration activities such as discovery of what is on the source server such as data, email contents, users, permissions, and meta structure of the source environment.

BRIEF SUMMARY

Embodiments can improve data migration processes using a data migration assistant that executes on a source system to facilitate the migration of documents to a destination system. The migration assistant executes on a computer of the source system. The migration assistant can communicate with a migration controller server. As part of an authentication process (e.g., after installation of the migration assistant), the migration assistant can send an identifier to a migration controller server. The identifier can identify the migration project that the migration assistant is to be used for. The migration controller server can use the identifier to determine commands corresponding to the migration project to send to the migration assistant.

The migration assistant can query a source document server to collect metadata from the source document server. The metadata corresponds to documents stored on the source document server, e.g., documents that are to be migrated. In some embodiments, the query can be based on instructions received from the migration controller server.

The migration assistant can establish a connection between the migration assistant and the migration controller server using the identifier. The metadata can be sent using the connection to the migration controller server. The migration assistant can receive one or more commands for the migration project from the migration controller server. The one or more commands can specify changes to be made for the source document server as part of the migration project. Once the migration assistant implements the one or more changes, a confirmation can be sent to the migration controller server. Such changes can automatically prepare the source document server for the migration, e.g., in a process that occurs after the migration assistant is installed.

Other embodiments are directed to systems, portable consumer devices, and computer readable media associated with methods described herein.

A better understanding of the nature and advantages of embodiments may be gained with reference to this detailed description and the accompanying drawings.

TERMS

A migration project corresponds to a migration documents from a particular source system to a particular destination system. The migration project can be for only certain documents to be migrated, which may be defined in creation of a migration project. Multiple migration projects can exist for a particular source system and a particular destination system. Various documents can be migrated, such as files and e-mails. A migration controller server can control a migration project.

A migration assistant executes on a computer of the source system and can provide information to the migration controller server, where the migration controller server can use the information in controlling the migration of documents. The migration controller can send instructions to the migration assistant specifying metadata to collect. The migration assistant can perform actions according to commands received from the migration controller server. The migration controller can also provide commands to a migration engine that migrates the documents. In some implementations, the migration may start after the migration assistant has implemented commands specified by the migration controller. Details of a migration controller can be found in U.S. Patent Publication 2013/0212200, which is incorporated by reference in its entirety.

An end user device of a source system can correspond to any user device (mobile or stationary) that does connect to the source system. The end user device can be on a local network with the source system.

DETAILED DESCRIPTION

Problems related to migration of data from systems may vary depending on the type of system involved, and each may require different solutions to address such problems. Such problems can stem from the human expertise required to complete complex server work, the need for precise timing of changes, the risk of error, complexity of the data being gathered, and the architecture of the system itself. The solutions to these problems provided by some embodiments may be applied to multiple different types of source systems, and certain examples in this application use a Microsoft Exchange® Server program (hereinafter referred to as "Exchange") in particular as an example for the purposes of illustration and description. It is not intended to be exhaustive or to limit embodiments to the precise form described, as embodiments can be applied to other systems.

To address such problems, embodiments (e.g., as implemented in a migration assistant) can gather (collect) an inventory of certain metadata about documents in a source document server of a source system. For instance, metadata can be obtained about directory services and email systems, for example in a Microsoft® Windows environment, Exchange and Microsoft® Active Directory (a directory service implemented by Microsoft® for Windows® domain networks). The term active directory can refer to any directory that can provide certain information about documents stored in a source document server. The metadata can be obtained without a physical presence at the source system, i.e. without a person having to manually perform operations at a computer of the source system.

In various embodiments, as examples of part of the collection of the metadata, the migration assistant can discover email contents, settings, users, permissions, and other structures and data for a migration from a source system to a destination system by gathering data that would otherwise be inaccessible using the Internet, packaging gathered data in a single document for convenience of storage and processing related to the migration to a destination system, automating various processes to reduce or eliminate the risk of human error, and sending commands to the source system to avoid default behavior that would disrupt the migration. Accordingly, embodiments can improve the quality and accuracy of a migration by allowing for a closer configuration of a destination environment to a source environment than would be obtainable without the migration assistant. The closer configuration can include for example, changing to an MEU from an on-premises mailbox, and generally make the destination environment mirror the source environment as closely as possible.

I. Introduction

Figure 1:
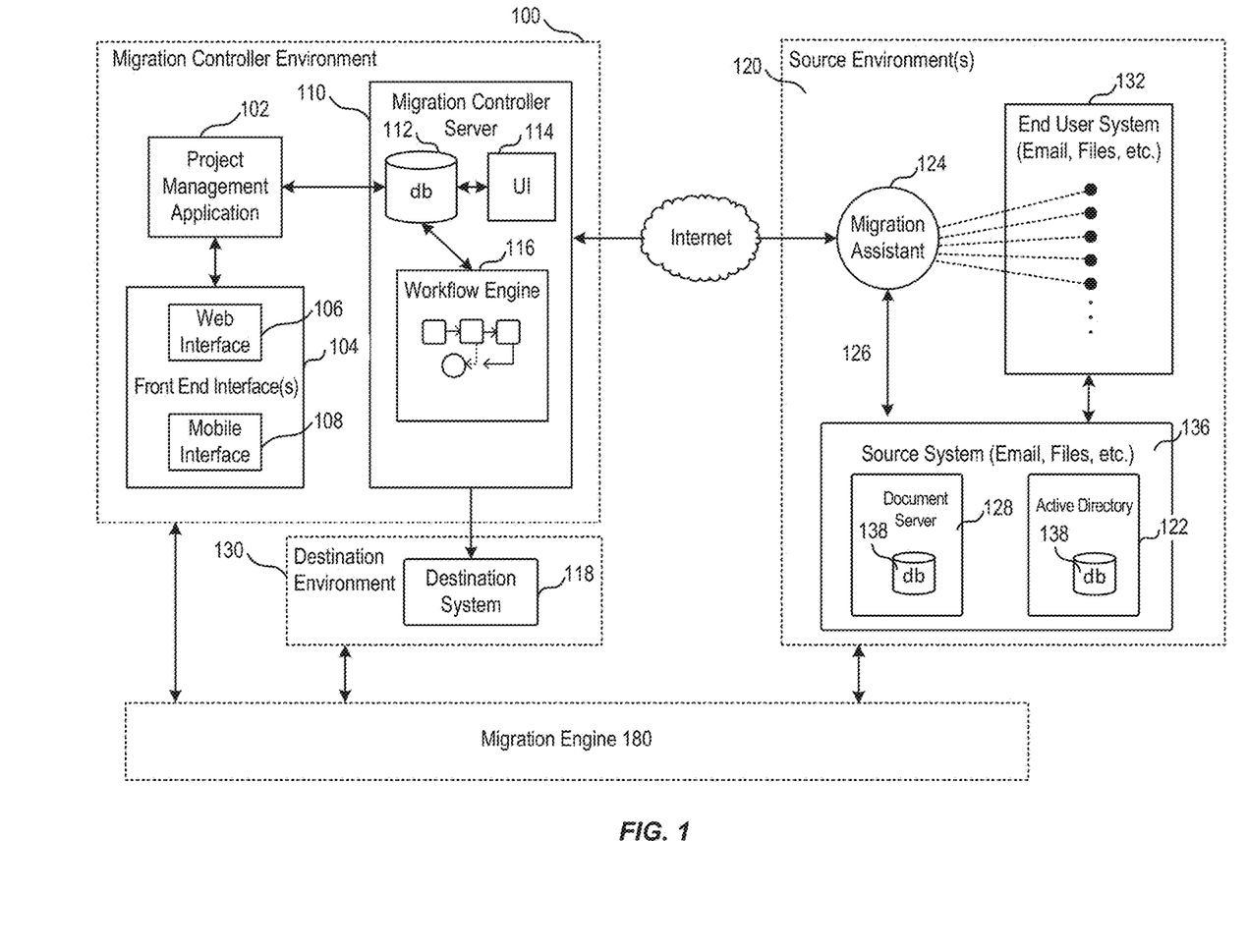
FIG. 1 is a schematic diagram of the architecture of a system for migrating data from a source system according to various embodiments.

FIG. 1 is a schematic diagram of the architecture of a system for collecting and packaging metadata from a source system 136 to optimize data migration from source system 136 to a destination system 118. The collection and packaging of the metadata may be performed by migration assistant 124, which can received commands from a migration controller server 110. Migration assistant 124 is an application that can be installed on a server on the same local area network (depicted as source environment 120) as source system 136 (i.e. local to the location of the data to be collected and migrated).

Migration assistant 124 can perform a deep inspection of source system 136 and gather various metadata ((also referred to as "inventory information") about source system 136. For example, the deep inspection can determine daat such as the first name and last name of account, title of a user, and detailed permissions. Migration assistant 124 can also receive commands from migration controller server 110, and performs those commands, e.g., to make changes to source system 136 in preparation for the migration to destination system 118.

As mentioned above, one problem with data migration is in the human error. Other problems also exist with respect to characteristics and features of the source system 136 that may be useful in some scenarios, but may also inhibit data migration; consider the example of a data migration from Microsoft Outlook® (an information manager that may be used with for example an Exchange® server like Document Server 128, and hereinafter referred to as "Outlook") to an online-based service. After Outlook® has been reconfigured by the migration assistant to communicate with the online-based service instead of the on-premise Exchange Server 128, unless certain actions are taken in a timely manner, Outlook® can reconfigure itself back to the on-premise Exchange Server 128 it was originally configured to. This can be problematic for the Outlook® user because they would be looking at their old non-online-based mailbox, which would no longer be receiving email sent to the user's email address because the email would be delivered to the online-based service. Furthermore, if the Outlook® user sends an email, makes changes to online calendar appointments, or creates or modifies contacts, etc., these changes will only apply to the old source mailbox since the source mailbox replication to the online-system had already been completed, and thus when Outlook® is fixed to communicate with the online-based service, these changes that the end user made will not be present in the online-based service. Email is an example of a document that can be migrated from a source system to a destination system.

One benefit of some embodiments is that it reduces or eliminates the human expertise required to complete the complex server work needed to avoid server behavior such as that outlined above. Another benefit of some embodiments is that the timing of changes to the source server can be made with the required precision to enable for example a synchronization of data as close in time as possible during a migration, even for large-scale data migrations, in an automated fashion. The risk of error in carrying out data migrations may decrease dramatically due to the above-listed benefits.

Another problem is that there are no solutions that gather an inventory of certain data in a source system's Exchange 128 and Microsoft® Active Directory 122 without a physical presence at the source system 136; such data may include, for example, details about the mailboxes of the source system 136 and its corresponding user, such as mailbox size, mailbox SMTP aliases, mailbox X500 addresses and aliases, mailbox legacy Exchange ID, user's job title, user's office location, user's address(es), mailbox permissions, security groups the user is a member of, etc. This data is not accessible remotely (via internet protocols or APIs). As such, companies must choose whether to spend more money to house certain equipment locally to gather such data, or to forego collection of that data and complete various steps manually following the migration. Some embodiments can use a Microsoft® technology called PowerShell® (a task automation and configuration management framework) to retrieve this information from Active Directory 122 and Exchange 128.

It is also difficult to structure the collected data in a single document for convenience of storage and processing related to the migration. This is due to the fact that the data may be for many users, and may describe one-to-many relationships (e.g. a single mailbox with multiple aliases) and many-to-many relationships (e.g. many security groups which each contain many users). A document containing this data may contain many thousands of lines and relationships. Embodiments can use XML to structure the data into a single document.

Accordingly, migration assistant 124 is installed local to the source system environment 120, which includes a document server 128 and active directory 122. Migration assistant 124 can communicate via connection 126 with source document server 128 and active directory 122 to collect metadata. The collected metadata may be sent to the migration controller server 110.

The migration controller server 110 can send commands to migration assistant 124, and the migration assistant 124 can send commands to active directory 122 and/or document server 128 to take various actions, both of which may report back status messages to the migration assistant 124. The status messages may be viewed on a front end interface 104 and/or administrative interface 114.

II. Installation, Registration, and Verification

In some embodiments, the migration assistant 124 may be installed local to the source system 136 and registered and verified with the migration controller server 110; registration, verification, and other communications between the migration assistant 124 and the migration controller server 110 take place over the internet, for example via publicly accessible web services such as an API interface. These actions may occur as described below.

Figure 2:
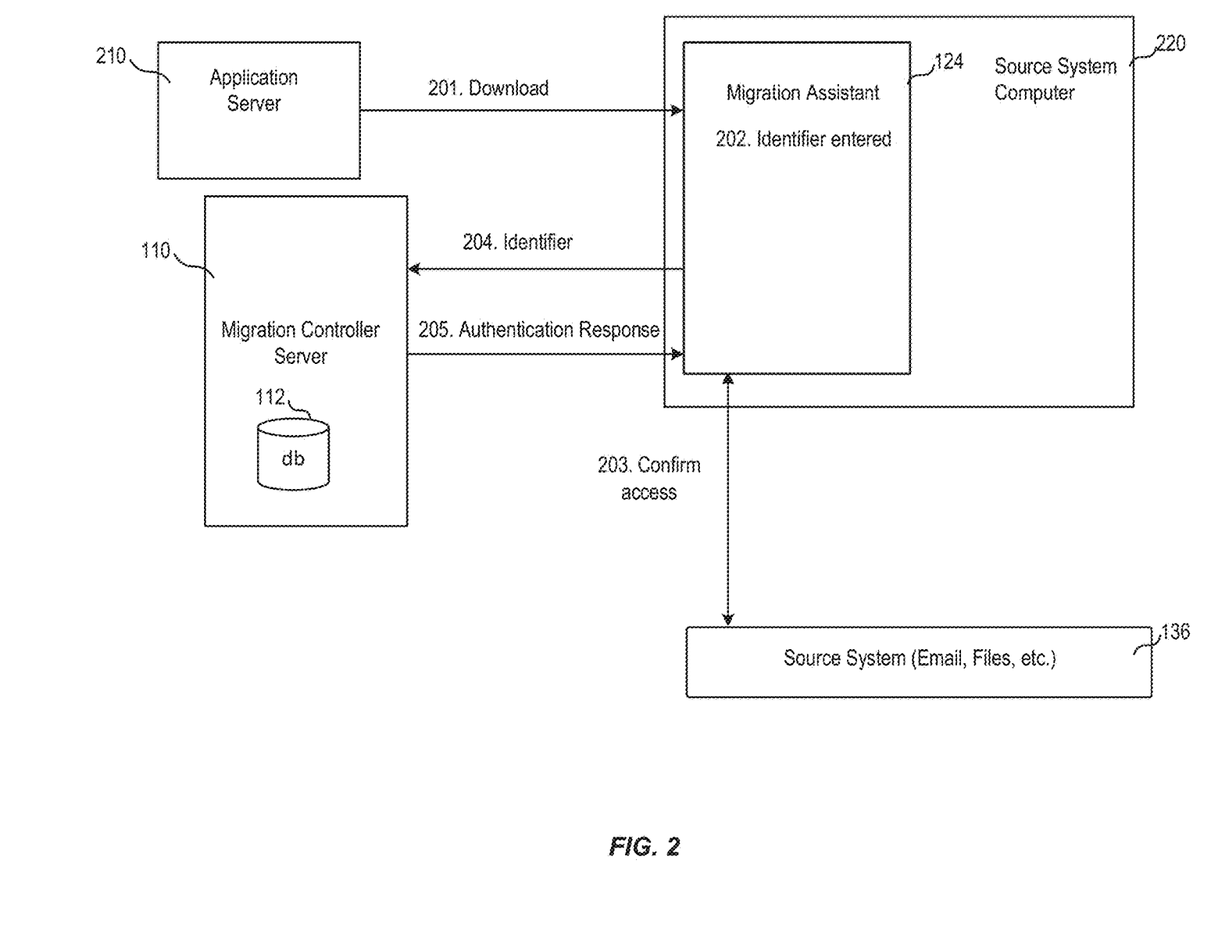
FIG. 2 shows a block diagram for the installation, registration, and verification of a migration assistant according to embodiments of the present invention.

FIG. 2 shows a block diagram for the installation, registration, and verification of a migration assistant according to embodiments of the present invention. Migration assistant 124 may be downloaded locally and installed on a server on a local area network connected to the source system 136. The installation can require that the migration assistant be linked to the source server by providing a unique product key or other registration code. By using the unique product key when communicating, the migration assistant can be uniquely identified. This can provide a form of authentication for the migration assistant. FIG. 2 refers to certain elements from FIG. 1.

Action 201 shows migration assistant 124 being downloaded from an application server 210. Application server 210 can be part of migration controller environment 100 of FIG. 1, or may be a separate server. Migration assistant 124 may be downloaded at a computer of the source system by an administrator.

Action 202 shows an identifier being entered, e.g., by an administrator that downloaded migration assistant 124. In one embodiment, the identifier can be a registration code that corresponds to a migration project that has been registered with the migration controller environment. The administrator can enter various information, such as a registration code, a domain name of the domain being migrated, which can also be called the order (project), a URL of the source document server, and credentials that have administrative access to the source document server. The information can be entered into a user interface by an operator, which may be a local user interface provided by migration assistant 124, or a web interface that migration assistant can access, such as front end interface 104.

The front end interface 104 is the user-facing front end of a project management application 102 used to manage and monitor data migrations; the project management application 102 may be web-based or application-based. An administrative user interface (UI) 114 may be used for administrative access to the project management application 102, for example to allow for additional permissions to manage a migration. The front end interface 104 may include a web interface 106 and/or a mobile interface 108.

Action 203 shows migration assistant 124 confirming access to source system 136. For example, after the registration code, domain name of the migration order (project), URL of the source document server, and credentials can be entered by an operator, migration assistant 124 may verify whether it can communicate with source system 136, and specifically with the source document server. For example, migration assistant 124 can confirm communication with a source email and user databases 138 through "PowerShell" or other task automation and configuration management framework.

Action 204 shows migration assistant 124 sending the identifier to migration controller server 110. For example, if migration assistant 124 is able to communicate with the source document server, migration assistant 124 may send the registration code and domain name of the order to a migration controller server 110. In some embodiments, migration controller server 110 may be a cloud server.

Action 205 shows migration controller server 110 sending an authentication response to migration assistant 124. Migration controller server 110 may also send a success/failure response to migration assistant 124 indicating whether or not migration controller server 110 received the registration code and domain name of the order.

If the registration code and domain name of the order were received, the migration controller server 110 may perform a lookup in a migration controller database 112 connected to the migration controller server 110 to find a corresponding project identifier that the particular migration assistant 124 is associated with. The project identifier can be a unique identifier for each order. Migration controller server 110 may send a success/failure response to the migration assistant 124 indicating whether or not there was a match. If there was a match, migration assistant 124 can enter a running state as an application or service, and the administrator or other user may be presented with confirmation of this via the front end interface 104 and/or administrative UI 114.

III. Inventory (Metadata) Gathering

In some embodiments, the migration assistant 124 can gather inventory related to the source system 136. The inventory may include, but is not limited to, the name of the Exchange server 128, a list of all client access servers related to the source system 136, details about the client access servers, information about the Active Directory controller, and results of a test of upload bandwidth between the migration assistant 124 and a data center local to the destination system 118 (e.g. the Microsoft® Data Center). The client access servers can comprise the servers that clients use to access their email. All of the data collected may be sent to the migration controller server 110, which analyzes the data to select and/or create various commands to be sent back to the migration assistant 124 at a later time. The data collected may comprise for example, mailboxes, distribution lists, names, phone numbers, any data that may be retrieved from the source system.

Figure 3:
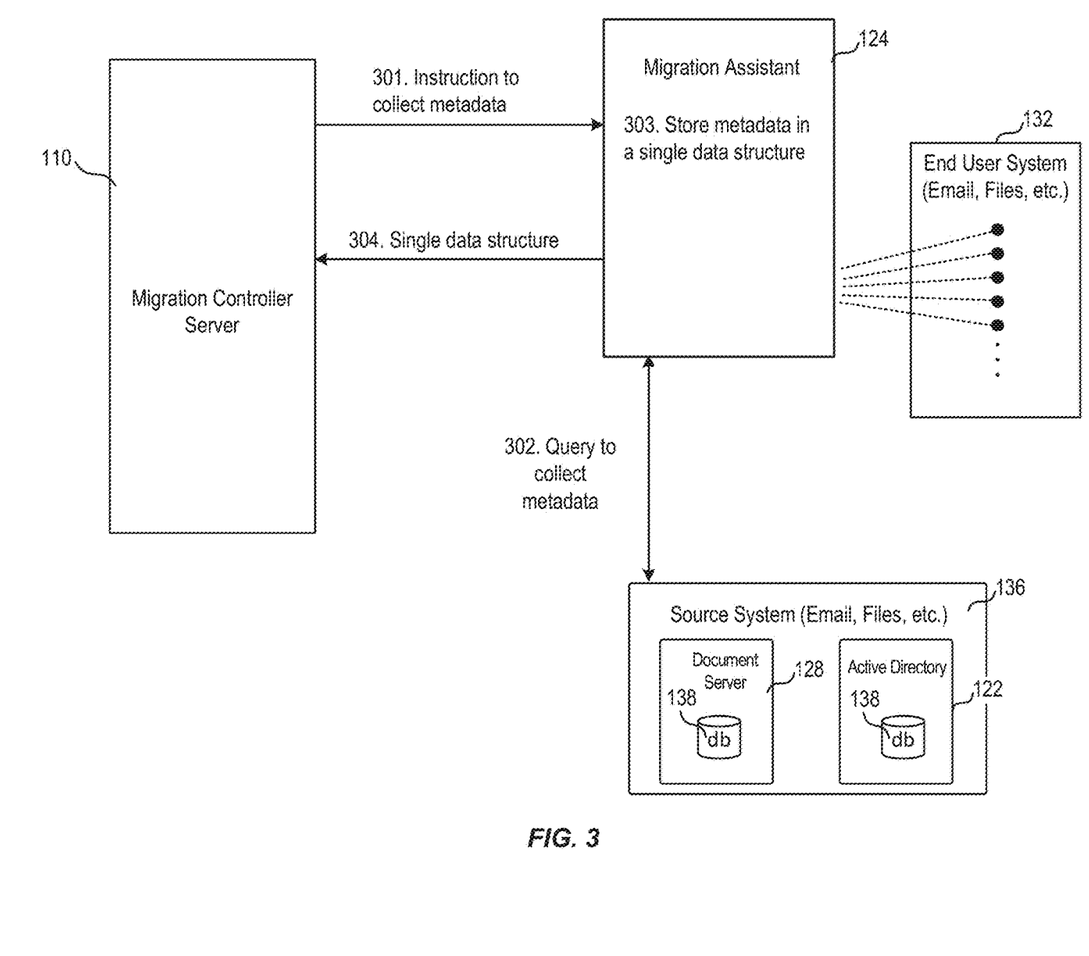
FIG. 3 shows a block diagram for the gathering of metadata (e.g., inventory data) according to embodiments of the present invention.

FIG. 3 shows a block diagram for the gathering of metadata (e.g., inventory data) according to embodiments of the present invention. The metadata can be collected from source system 136 using migration assistant 124. The collection can be based on instructions from migration controller server 110. FIG. 3 refers to certain elements from FIG. 1.

Action 301 shows migration controller server 110 sending an instruction to collect metadata. For example, migration controller server 110 may send migration assistant 124 an instruction to collect various business rules from source document server 128 and active directory 122 local to source system 136, which in effect establishes an inventory of those environments. Many of these business rules would not be accessible using remote access methods. But with the aid of the migration assistant 124 running on the local network of the source system 136, a local API (which may be provided by a third party) may be used to gather the data.

Action 302 shows migration assistant 124 querying source system 136 for the specified metadata, which may include business rules. Business rules that may be collected include, but are not limited to, user mailboxes, primary SMTP addresses for each mailbox, usernames, aliases assigned to mailboxes, permissions for the mailboxes and its folders and subfolders (e.g. permission for User B to have read access to User A's calendar), collections of people that appear in an address book such as a list of distribution groups and their aliases, and a list of mailboxes that are members of the distribution groups.

Action 303 shows migration assistant storing the metadata in a single data structure. For example, the collected inventory of business rules can be stored in an in-memory data structure called an "instance of a class." This class instance can be serialized into an XML document by way of various software programming techniques, and saved to a standard data file location that is available for programs running on a computer.

Action 304 shows migration assistant 124 sending the single data structure to migration controller server 110. For example, the XML file can then be sent to the migration controller server 110 via a web service call (protocol used for communicating between two different systems), stored in a database, such as a cloud database, and then replicated in the destination system 118.

With this solution, the quality, accuracy and breadth of information that is migrated to the destination system 118 may be improved over what would be obtainable by using strictly remote access (i.e. without the support of the migration assistant 124).

For example, without migration assistant 124, an internet discovery process could find all distribution group email addresses and who is in those distribution groups, and those distribution groups could be recreated on the destination system 118 and any emails to those distribution groups would be delivered to the right people. With the support of the migration assistant 124 making queries, such as a PowerShell-based queries of the source email and user databases, however, more information may be obtained, e.g. the "friendly" name of the distribution group that users in the organization see may be obtained, as well as rules dictating whether or not people should be allowed to email the distribution group from outside the company. As such, the migration assistant 124 may provide a more thorough discovery of information, which allows for a migration that, after completion, is less visible to users and requires less effort to make the migrated environment at the destination environment 130 appear and perform like the original source environment 120. The source environment can comprise an email system and other environment around it, for example a directory system such as Active Directory. The queries may try to obtain information such as the number of accounts, number of mailboxes, details about each account such as first name, last name, and phone number, the primary email account.

Further, source system data that is available for collection via remote access methods may be collected with higher speed and accuracy by the migration assistant 124, since it may directly query active directory 122 and other sources on source system 136. Remote collection relies on the quality of the protocols for the information, which may not have been designed to provide that information, and therefore may result in incomplete data transfer.

IV. Preparation of Migration Using Migration Assistant

The migration assistant can be used to operations to prepare for a migration of documents from a source system to a destination system. For example, the migration assistant can collect metadata about the source system, for a migration controller to analyze. The migration controller can determine changes that are required at the source system. The migration controller can generate the commands and send them to the migration assistant for implementing the changes to the source system.

A. Block Diagram

Figure 4:
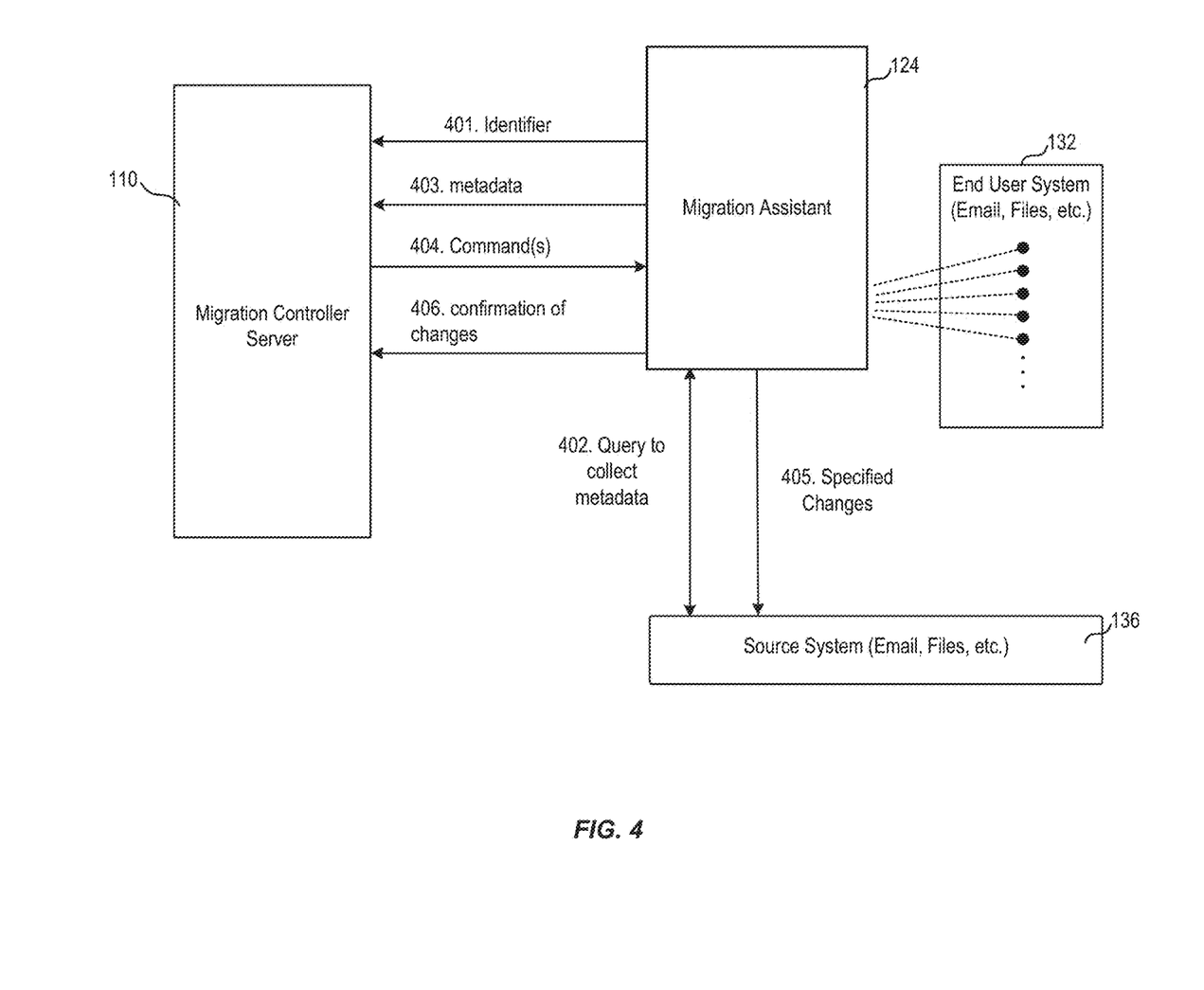
FIG. 4 shows a block diagram for using a migration assistant executing at a source system for a migration project according to embodiments of the present invention.

FIG. 4 shows a block diagram for using a migration assistant executing at a source system for a migration project according to embodiments of the present invention. FIG. 4 refers to certain elements from FIG. 1.

Action 401 shows an identifier that identifies a migration project being sent from the migration assistant 124 to the migration controller server 110. The identifier can identify the migration project that the migration assistant is to be used for. The migration controller server can use the identifier to determine commands corresponding to the migration project to send to the migration assistant.

Action 402 shows migration assistant 124 querying source server 136 to collect metadata from the source server, the metadata corresponding to documents stored on the source server. The migration assistant can query using the first communication connection channel. In response to the query, the source server may send back any metadata found. For example, the commands may comprise Powershell queries to the source system to obtain data and metadata pertaining to documents in a document server of the source system or directory data from a directory service.

Action 403 shows migration assistant 124 sending the collected metadata to the migration controller server. The metadata may include information about how many mailboxes are on a document server and details about each mailbox, such as user information including first name, last name, phone number, email address, aliases, the amount of data stored in a mailbox, and other similar data. The migration controller server 110 can generate one or more commands based on the metadata sent to it. The commands may be determined based on input from an operator at the migration controller server 110, where the input may be received before or after receiving the metadata. For example, the user input can have previously specifies an amount of time for the migration or a number of documents to be transferred per stage. Migration controller server 110 can then automatically determine which accounts to migrate and which changes need to be made at the source server.

Action 404 shows sending any commands generated by migration controller server 110 to migration assistant 124. The commands can specify for example which accounts are to be migrated. The commands can also specify which accounts need to be changed during or after a migration. The commands may specify changes to be made for the source system as part of the migration project. Examples of change commands are provided below and can include disabling features and changing settings (e.g., links to user accounts).

Action 405 shows sending specified changes from migration assistant 124 to source system 136. The specified changes can automatically prepare the source document server for the migration, e.g., in a process that occurs after the migration assistant is installed. The commands for example, can specify forwarding of mail and data from one account to another. A command can instruct a server to convert an on-premises mailbox into an MEU.

Action 406 shows a confirmation message being sent from migration assistant 124 to migration controller server 110. When the migration changes are completed, commands can be sent from the migration assistant to indicate completion of the changes needed for migration. In response to the confirmation message, the migration controller server 110 can then begin control of the migration, e.g., by sending commands to a migration engine.

B. Method

Figure 5:
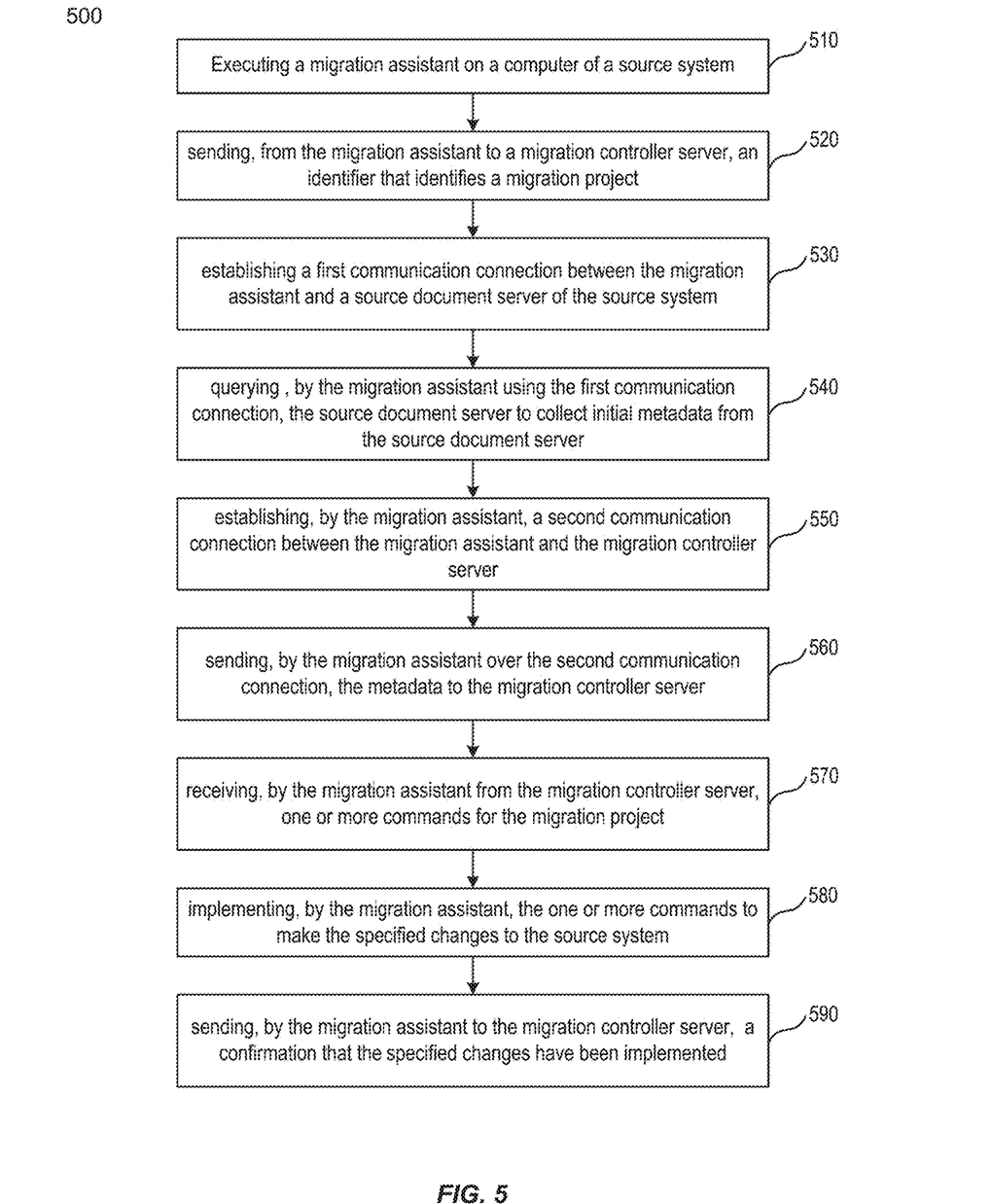
FIG. 5 is a flow diagram of a migration process using a migration assistant according to embodiments of the present invention.

FIG. 5 is a flowchart of a method 500 of a migration process using a migration assistant according to embodiments of the present invention. Method 500 may be implemented by elements of a migration controller environment, e.g., in communication with a migration assistant, as seen in FIG. 1.

At block 510, a migration assistant may be executed on a computer of a source system. The execution may start up the migration assistant to prepare it for a migration. The migration assistant will already be installed in the source environment. When installed, a unique identifier or product key that is associated with the migration assistant will have been generated.

At block 520, an identifier that identifies a migration project can be sent, from the migration assistant to a migration controller server. The identifier can identify the migration project that the migration assistant is to be used for. The migration controller server can use the identifier to determine commands corresponding to the migration project to send to the migration assistant. This identifier can be used as part of an authentication mechanism.

At block 530, a first communication connection between the migration assistant and a source document server of the source system can be established. This first communication connection may be used by the migration assistant to collect relevant data and metadata from a source system of the source environment.

At block 540, the migration assistant using the first communication connection may query the source document server to collect data and metadata from the source document server. The metadata may correspond to documents stored on the source document server. Once the metadata is received, the migration controller server may generate the one or more commands based on the metadata. The migration assistant may issue commands, such as Powershell queries, to the source system to obtain data and metadata pertaining to, for example, documents in a document server of the source system or directory data from a directory service. The queries may ask for information such as how many mailboxes are on a document server and details about each mailbox such as the user information including first name, last name, phone number, email address, aliases, the amount of data stored in a mailbox, and other similar data.

At block 550, a second communication connection between the migration assistant and the migration controller server is established by the migration assistant using the identifier. This connection may be authenticated using the identifier and possibly other factors, e.g., as described above.

At block 560, the migration assistant can send, via the second communication connection, the metadata to the migration controller server. Once the connection is established and authenticated, the migration assistant may send data and metadata collected to the migration controller server.

At block 570, the migration assistant can receive from the migration controller server, one or more commands for the migration project. The one or more commands can specify one or more changes to be made for the source system as part of the migration project. The commands can specify for example which accounts are to be migrated. The commands can also specify which accounts need to be changed at various times through a migration.

At block 580, the migration assistant may implement the one or more commands to make the specified changes to the source system. The specified changes can automatically prepare the source document server for the migration, e.g., in a process that occurs after the migration assistant is installed. The commands may specify that mail is to be forwarded from one account to another. A command may instruct a server to convert an on-premises mailbox into an MEU.

At block 590, the migration assistant can send a confirmation to the migration controller server, the confirmation stating that the specified changes have been implemented. The confirmation can be conveyed in any suitable manner. In various embodiments, the confirmation can be sent only when the specified changes have been made, or may be sent at a predetermined time after the commands are received at block 570. The confirmation can always indicate a successful implementation of the changes, or sometimes different status messages can be sent. For example, the confirmation can be a binary flag that indicates the success or failure. Other embodiments can indicate varying levels of partial success for some commands or partial failure.

V. Service Call

In some embodiments, the migration assistant 124 may send a web service call to the migration controller server 110 to check if there are any commands for the migration assistant 124 to perform (e.g. query the email system for a list of all user mailboxes and their details and send back to the migration controller). If there are one or more commands to perform, the migration controller server 110 may send the command(s) to the migration assistant 124. If there are no commands to perform, the migration controller server 110 may send a message to the migration assistant 124 reporting as such. This process may be repeated at predefined intervals, e.g. once every minute.

Other examples of commands that might be sent to the migration assistant 124 by the migration controller server 110 include, but are not limited to: obtaining a list of all distribution groups and their membership, obtaining a list of all security groups and their membership, setting up a forwarding rule for a specific mailbox to forward mail to a specified external email address, and to convert an on-premises mailbox to a "mail enabled user" (MEU). This conversion of an on-premises mailbox to an MEU can in effect delete the mailbox from the system. The MEU can be a user account in a directory service such as Active Directory that has an e-mail address associated with it, but has no mailbox on an on-premises mail server, such as an Exchange server. A mail-enabled user can send and receive e-mail using another messaging system, for example an Office 365 system.

VI. Commands

In some embodiments, the commands that the migration controller server 110 sends to the migration assistant 124 are managed and executed via a workflow engine 116, which can comprise a server or part that can manage the order in which commands are sent out. Such commands may depend on the nature of the migration. For example, some migrations of data from a source system 136 that serves a relatively small number of users may be done most efficiently in a single pass or single stage (hereinafter referred to as a "cutover migration"). On the other hand, migrations of data from a source system 136 that serves a relatively large number of users may be optimized by being performed in stages (hereinafter referred to as a "staged migration"). In each of these cases, the migration assistant 124 may run different commands to optimize the different types of migrations; a discussion of the commands that may be run in these two scenarios follows below.

A. Cutover Migration Commands

In some embodiments, the migration controller server 110 may send to the migration assistant 124 one or more commands to optimize a cutover migration. These commands may include but are not limited to: collect business rules, disable a feature of Microsoft Exchange 128 called "Outlook Anywhere®," and reconfigure the source system's service connection points (objects in Active Directory 122 that hold information about services and are hereinafter referred to as "SCPs"). These commands are discussed in turn below.

Figure 6:
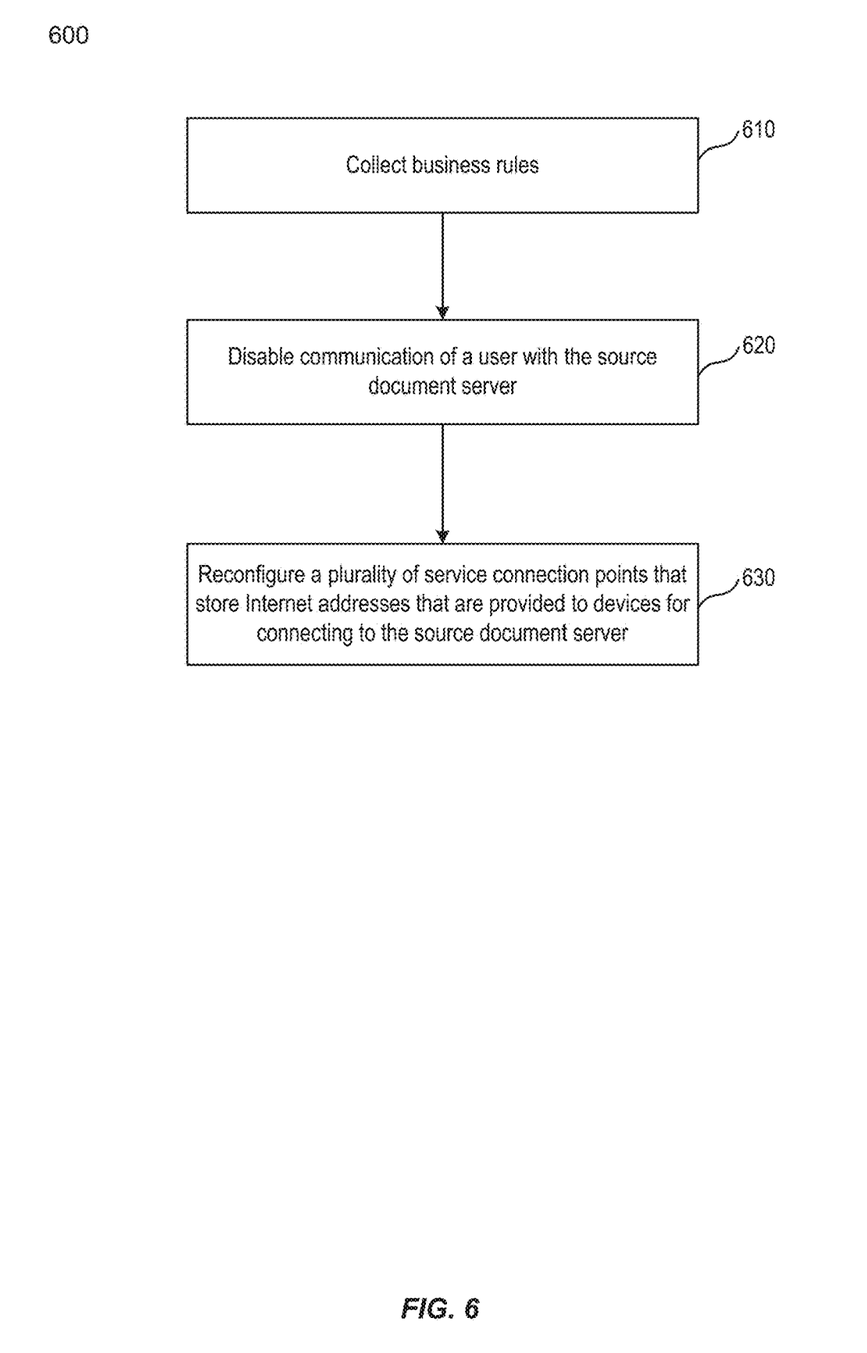
FIG. 6 is a flow diagram of a cutoff migration according to various embodiments.

FIG. 6 is a flow diagram of a method 600 for a cutover migration according to various embodiments. Method 600 can be performed by a migration assistant pursuant to commands from a migration controller.

At block 610, business rules can be collected from a source server. Business rules can comprise all of the different configuration settings that may be in place on a source server. For example, aliases that have certain rules on them so that emails get forwarded somewhere else in an organization when they come in, distribution groups having one or more members in them. Business rules that may be collected can also include, but are not limited to, user mailboxes, primary SMTP addresses for each mailbox, usernames, aliases assigned to mailboxes, permissions for the mailboxes and its folders and subfolders (e.g. permission for User B to have read access to User A's calendar), collections of people that appear in an address book such as a list of distribution groups and their aliases, and a list of mailboxes that are members of the distribution groups.

At block 620, the communications between the source server and a user are disabled. As the user has been migrated over to another service, the communication to the source server may no longer be needed. In doing so, the system can take care to change settings so that the connections are not re-enabled.

For example, "Outlook Anywhere®" could be disabled. "Outlook Anywhere®" is a service that allows users to connect to the Exchange server 128 from the internet. If users use Outlook Anywhere® during the latter stages of a migration, however, they will be directed to the wrong server (i.e. a server at the source system 136), and they will not receive the emails that are being sent to them. As such, in some embodiments the migration controller server 110 can send the migration assistant 124 a command to connect to the primary Microsoft Exchange server 128 (which is Microsoft's® implementation of an email system) local to the source system 136 and disable Outlook Anywhere®. By disabling Outlook Anywhere® and stopping users from communicating with their old mailbox, the chance of incoming email being delivered to the wrong location may be reduced or eliminated. Some embodiments may execute this command to disable Outlook Anywhere® close to (e.g. within five minutes of) the specified final migration date and time (which may be specified by a partner or customer) to reduce the risk of mail being delivered to the wrong location.

At block 630, the service connection points that store Internet addresses that are provided to devices for connecting to the source document server are reconfigured to change how connections are made. As an example, the SCP (service connection point) can be a piece of information that a Microsoft Exchange server 128 stores in its database which holds an internet URL, which when asked for, the Exchange server 128 will provide to an end user's email system 132 (e.g. Outlook® or mobile device) which in turn is used by this email system to configure itself and connect to the email server.

In some embodiments, the migration controller server 110 may send the migration assistant 124 a command at or shortly after the final migration date and time to reconfigure the auto-discover address of every SCP (service connection point) that is local to the source system 136; the migration assistant 124 may then execute this command. The final migration date and time can refer to the date and time to complete a migration. The Autodiscover address or URL can comprise an internet URL to negotiate a handshake.

A reason behind executing the command to reconfigure the Autodiscover address of every SCP local to the source system 136 is as follows: as part of a migration, the local email application communicates with a mailbox at the destination system 118 of the migration (e.g. Office 365®, Google®, etc.). The local email application, however, has a mechanism to check the Autodiscover address of the source system's SCPs at intervals (e.g. every 30 minutes); if the Autodiscover address of the SCPs do not match the Autodiscover address associated with the destination system 118 of the migration, then the local email application will reconfigure itself to communicate with the mailbox on the source system 136. If this occurs after the migration date and time, extra time and expense will be required to re-direct the email client to communicate with the new destination email system.

To remedy the above problem, in some embodiments the migration assistant 124 may be commanded by the migration controller server 110 to connect to each client access server (known as "CAS", a Microsoft® Server used as a proxy for email clients to connect to, which in turn connects them to the email database) that it discovered earlier when collecting the business rules, and update the SCP Autodiscover URL for each one so that it matches the new destination system 118 of the migration. This may be done manually or automatically, and preferably, immediately (i.e. within a few seconds) prior to the local email application being reconfigured to communicate with the destination system 118, so that all subsequent checks by the local email application on the Autodiscover address are less likely to encounter mismatched Autodiscover addresses, and therefore less likelihood of reverting back to the mailbox on the source system 136.

B. Staged Migration Commands

In some embodiments, the migration controller server 110 may send to the migration assistant 124 one or more commands that can optimize a staged migration. One such command that the migration assistant 124 may carry out is to convert one or more mailboxes to "mail enabled users" (hereinafter referred to as "MEUs"). An MEU is an object in the Exchange server 128 that instructs Exchange 128 that the mailbox for a specific email address is located at a location outside of its local Active Directory environment 122.

Figure 7:
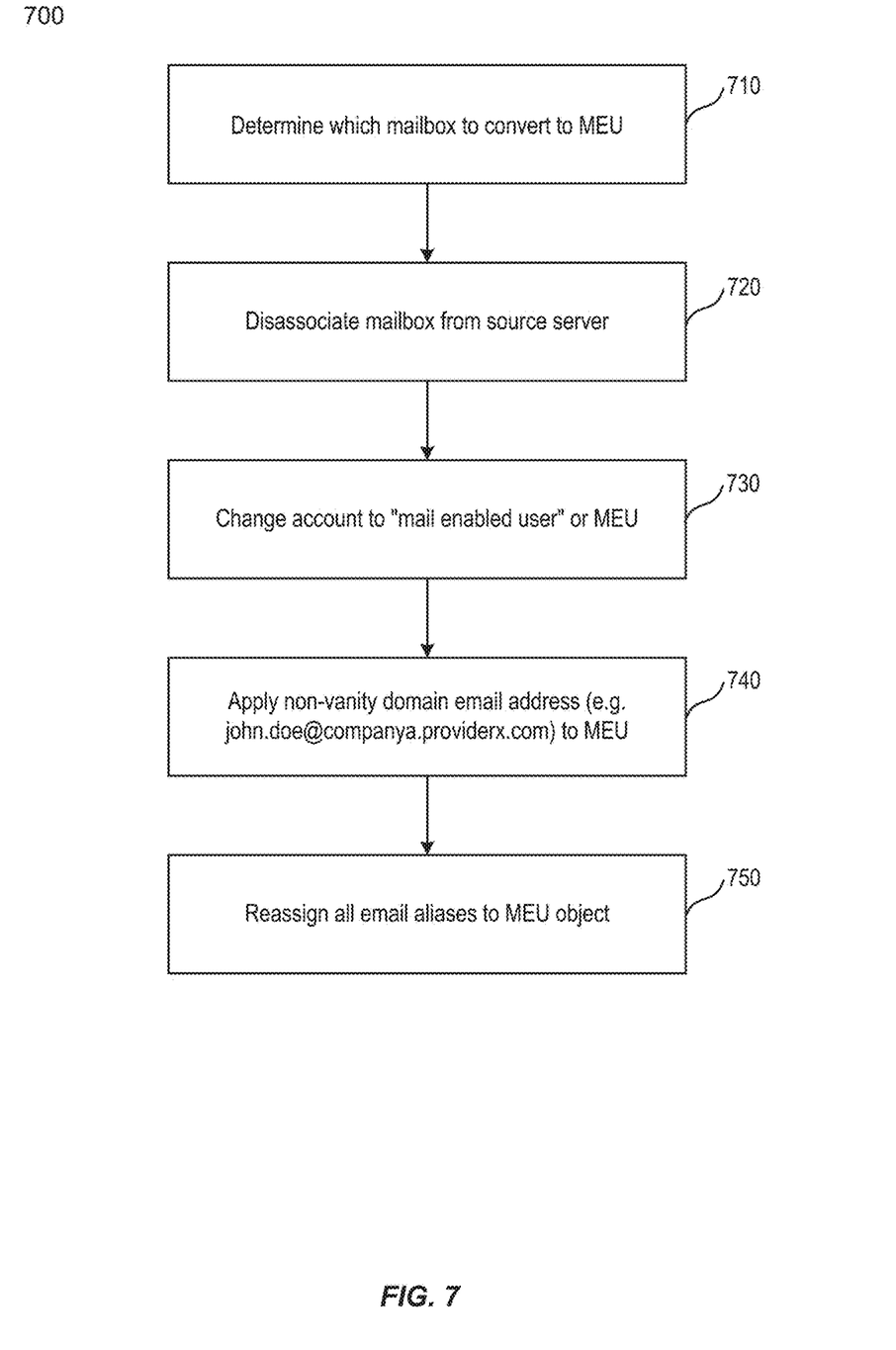
FIG. 7 is a flow diagram of a staged migration according to various embodiments.

FIG. 7 is a flow diagram of a method 700 of staged migration according to various embodiments. For each mailbox that the migration controller server 110 commands migration assistant 124 to convert to a MEU, the following may be done by some embodiments. Method 700 can be performed by a migration assistant pursuant to commands from a migration controller.

At block 710, the list of mailboxes to convert to an MEU is determined. As each mailbox that is part of a stage scheduled to be converted finishes its final synchronization with the mail server, the migration controller server 110 may send the command to convert those mailboxes to MEUs. After the command is received by the migration assistant 124, it connects to the Exchange server 128 local to the source system 136. The migration assistant 124 gathers all of the email addresses associated with the mailbox to be converted.

At block 720, a mailbox that is to be converted to an MEU is disassociated from the source server. The migration assistant 124 can then disable the mailbox. The mailbox can be disassociated in a variety of ways. For example, the migration assistant can send commands to the mailbox or to the source server, or to both.

At block 730, an MEU object is created for the user account that was previously associated with a mailbox account on the source server. Once the MEU object is created, the user account can be changed to be an MEU account.

At block 740, any of the aliases that used to be on the mailbox are converted to the MEU object. This can apply to any of the non-vanity addresses and aliases that used to be on the mailbox account on the source server.

At block 750, all email aliases that used to be on the mailbox are reassigned to the MEU object. The forwarding address of the MEU to the appropriate destination email address can be modified.

A reason the forwarding address is set to a different domain is that for many email systems, for each mailbox that is created, a unique email address on that provider's domain is given. For example, a person, John Doe, who works at Company A and gets a mailbox from Provider X might receive the following email addresses: john.doe@companya.com and john.doe@companya.providerx.com. The latter is a unique address and is the forwarding address that the migration assistant 124 assigns to the MEU that is created. This is done because if the former address was assigned to the MEU, then Exchange 128 would not be able to deliver the email to the appropriate mailbox on the destination system 118 because the Exchange server 128 would still be hosting email for the domain that the email address is a member of, so Exchange 128 would look internally for the mailbox.

After the MEU conversion commands are completed, the migration assistant 124 may return a success/failure status message to the migration controller server 110, and then returns to the service call process described above.

For example, in a staged migration of 1000 mailboxes, there may be 100 mailboxes in a stage that are scheduled to be migrated at 5 PM. At 5 PM, the final synchronization of those mailboxes is started. The migration controller server 110 will not send the command to convert any mailboxes whose synchronization has not finished; if the migration controller server 110 did send the command before the synchronization was finished, the synchronization would fail because the mailbox could be deleted or deactivated at its source, making the mailbox no longer accessible. Therefore, if only one mailbox has finished the synchronization at the time the migration assistant 124 polls the migration controller server 110 for commands during its service call process, then the migration controller server 110 will send the command to convert that mailbox, and only that mailbox, to an MEU. And if multiple mailboxes have finished their synchronization at the time of the service call, the migration assistant 124 will be commanded by the migration controller server 110 to convert those mailboxes to MEUs. This process is repeated until all mailboxes in the stage have been converted to MEUs.

The reason this command to convert the mailboxes to MEUs is carried out is similar to the reasoning behind the reconfiguration of the SCPs' Autodiscover URLs in the case of cutover migrations. If the mailbox is not converted to an MEU, Outlook will be reconfigured to communicate with the mailbox on the source system 136, rather than the desired mailbox at the destination system 118, and a migration already in progress may be disrupted. Mailboxes do not need to be converted to MEUs in cutover migrations, however, because changing the DNS record during a cutover migration completely re-routes mail destined for the source system 136 to the destination system 118.

The sequencing and timing of the steps taken in the above-described command sequence for some embodiments is important so that the MEUs are created correctly and mail flow will not be inhibited; other sequences may be used in other embodiments not described herein.

Accordingly, the migration assistant can be receive one or more additional commands at a later stage from the migration controller server, and then implement the one or more additional commands at the later stage when the additional command(s) are received.

VII. File Migration

Some embodiments may be used for file migrations from a source system 136 to a destination system 118. A file is another example of a document that may be migrated from a source system to a destination system. An example of how this may be done is as follows.

The migration controller server 110 sends a command to the migration assistant 124 to get a list of all file servers in the source system environment 120 and data related to those file servers. The migration assistant 124 can crawl the network by communicating 126 with a directory service such as Active Directory 122 to get a list of all servers, connects each of those servers to retrieve their file hierarchy, and retrieves the hierarchy of folders for all the servers on the network. All of this data may be combined in a single document such as an XML document and sent to the migration controller server 110. Partners and/or their customers may go to a centralized user interface such as a user portal website, see all this information in the front end interface 104, and specify which files should be migrated.

The migration controller server 110 may send another command, to migrate some or all of the hierarchy that was retrieved. The command includes a list of all the folders and subfolders that should be migrated, along with the location they should be migrated to. The migration assistant 124 connects out to that server, and reads all the documents in the hierarchy and copies them up to the location specified by the migration controller server 110.

The migration controller server 110 may send another command, to perform synchronization of the file structure/hierarchy. The migration controller server 110 specifies the server and hierarchy to synchronize, and the destination system 118 to synchronize to. The migration assistant 124 makes a comparison between the source environment 120 and destination environment 130, and any deltas discovered are reconciled by either re-copying the file or copying the new file to the destination system 118.

The migration controller server 110 may send another command, directing the migration assistant 124 on how much bandwidth should be used to migrate files. Such bandwidth caps might depend on, for example, when the traffic is occurring: what hour of the day, and whether on a weekday or a weekend.

VIII. Computer System

Figure 8:
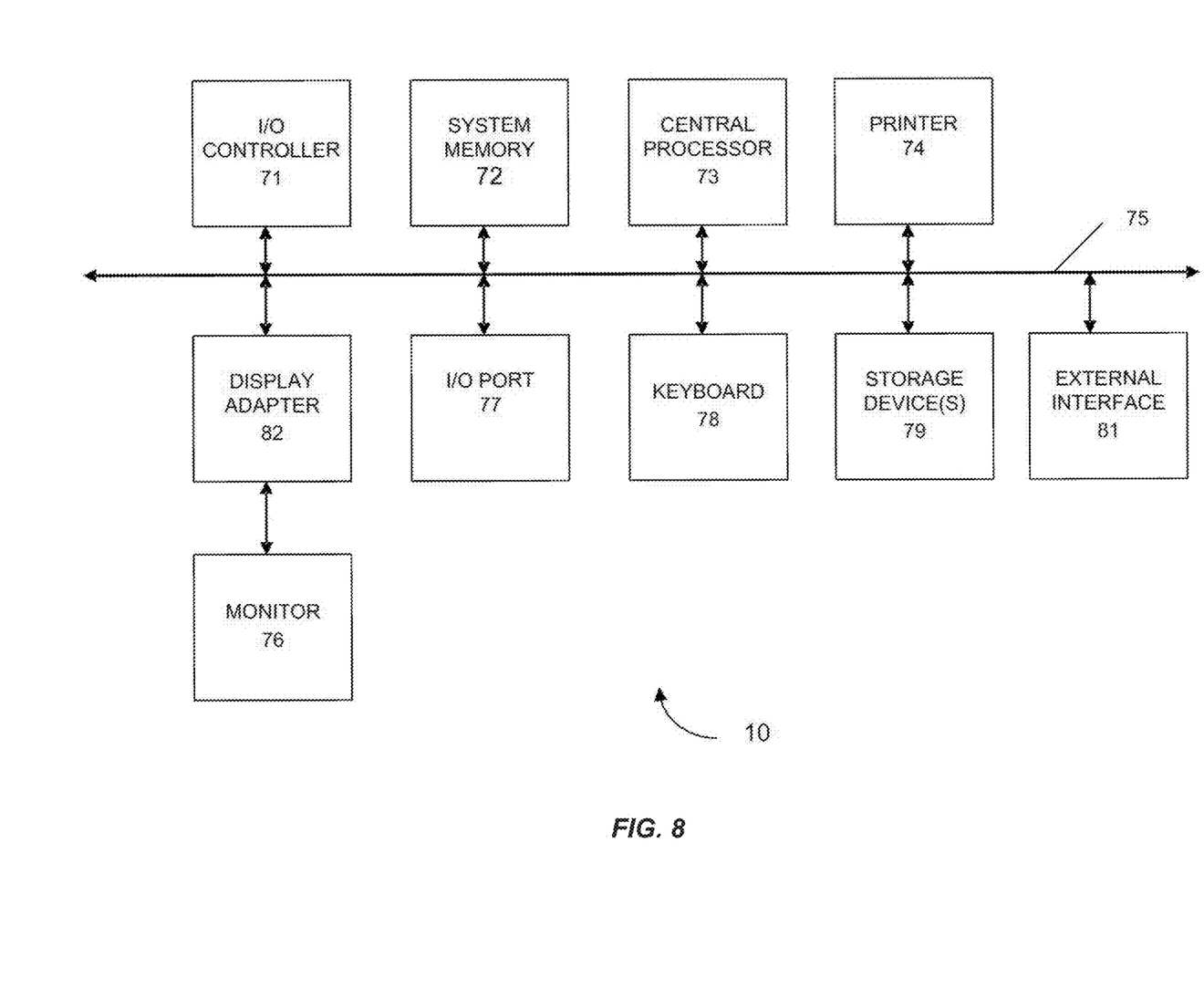
FIG. 8 shows a block diagram of an example computer system 10 usable with system and methods according to various embodiments.

Any of the computer systems mentioned herein may utilize any suitable number of subsystems. Examples of such subsystems are shown in FIG. 8 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to various embodiments may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner. However, other embodiments may be directed to specific embodiments relating to each individual aspect, or specific combinations of these individual aspects.

The above description of exemplary embodiments has been presented for the purposes of illustration and description. It is not intended to be exhaustive or to limit the invention to the precise form described, and many modifications and variations are possible in light of the teaching above. The embodiments were chosen and described best explain principles and their practical applications.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A method comprising:
receiving, from a migration assistant being executed on a source system, an identifier that identifies a migration project for migrating documents from the source system to a destination system;
facilitating establishing, using the identifier, a communication link with the migration assistant;
sending, to the migration assistant, an instruction to collect metadata from a source document server of the source system, the metadata corresponding to documents stored on the source document server;
receiving, from the migration assistant over the communication link, the metadata collected by the migration assistant according to the instruction;
generating one or more commands based on the metadata, the one or more commands specifying changes to be made for the source system as part of the migration project;
sending, to the migration assistant over the communication link, the one or more commands for the migration project; and
receiving, from the migration assistant over the communication link, a confirmation that the specified changes have been implemented according to the one or more commands.

2. The method of claim 1, wherein the identifier is received after the migration assistant is installed on the source system, and wherein the identifier includes a registration code entered at a user interface of the migration assistant.

3. The method of claim 2, further comprising:
using the identifier to authenticate the migration assistant and determine the migration project; and
sending, to the migration assistant over the communication link, an authentication response that the migration assistant has been authenticated.

4. The method of claim 1, wherein the metadata specifies a number of user accounts in the source document server and identifying information for each user account.

5. The method of claim 1, wherein the instruction specifies that the metadata is to include distribution groups and their membership and security groups and their membership.

6. The method of claim 1, wherein the source document server is an e-mail server, and wherein the instruction specifies to collect rules about an operation of the source document server, and wherein the rules are related to one or more of:
user mailboxes, primary SMTP address for each mailbox, usernames, aliases assigned to mailboxes, permissions for the mailboxes and its folders and subfolders, a list of distribution groups and their aliases, a list of mailboxes that are members of the distribution groups, mailbox permissions, and user information.

7. The method of claim 6, further comprising:
receiving, from the migration assistant over the communication link, a data file comprising the rules.

8. The method of claim 7, wherein the rules are serialized in the data file, and wherein the data file is an XML file.

9. The method of claim 1, wherein a plurality of documents to be migrated include emails of a specific mailbox on the source system, wherein the one or more commands include:

a disassociation of the specific mailbox from the source system; and
a forwarding rule for the specific mailbox to forward email to a specified external email address associated with the destination system.

10. The method of claim 9, wherein the one or more commands further include:
a conversion of the specific mailbox to have a status that the specific mailbox for a specific email address is located at a location outside of its local environment.

11. The method of claim 1, wherein the one or more commands are for a cutover migration or are for a staged migration.

12. The method of claim 1, wherein the one or more commands include: collecting business rules specifying which users can access which documents of the source document server.

13. The method of claim 1, wherein the one or more commands include a command to disable communication of a user with the source document server.

14. The method of claim 1, wherein the one or more commands include a command to reconfigure a plurality of service connection points that store Internet addresses that are provided to devices for connecting to the source document server.

15. A computer product comprising a non-transitory computer readable medium storing a plurality of instructions for controlling a computer system of a source system, the instructions comprising:
receiving, from a migration assistant being executed on a source system, an identifier that identifies a migration project for migrating documents from the source system to a destination system;
facilitating establishing, using the identifier, a communication link with the migration assistant;
sending, to the migration assistant, an instruction to collect metadata from a source document server of the source system, the metadata corresponding to documents stored on the source document server;
receiving, from the migration assistant over the communication link, the metadata collected by the migration assistant according to the instruction;
generating one or more commands based on the metadata, the one or more commands specifying changes to be made for the source system as part of the migration project;
sending, to the migration assistant over the communication link, the one or more commands for the migration project; and
receiving, from the migration assistant over the communication link, a confirmation that the specified changes have been implemented according to the one or more commands.

16. The computer product of claim 15, wherein the identifier is received after the migration assistant is installed on the computer of the source system, and wherein the identifier includes a registration code entered at a user interface of the migration assistant, and wherein the instructions further comprise:
using the identifier to authenticate the migration assistant and determine the migration project; and
sending, to the migration assistant over the communication link, an authentication response that the migration assistant has been authenticated.

17. The computer product of claim 15, wherein
the instructions specifies that the metadata is to include
distribution groups and their membership and security
groups and their membership.

18. The computer product of claim 15, wherein the source document server is an e-mail server, and wherein the instructions specify to collect rules about an operation of the source document server, wherein the instructions further comprise:
storing the rules into a data file.

19. The computer product of claim 15, wherein a plurality of documents to be migrated include emails of a specific mailbox on the source system, wherein the one or more commands include:
- a disassociation of the specific mailbox from the source system;
- a forwarding rule for the specific mailbox to forward email to a specified external email address associated with the destination system; and
- a conversion of the specific mailbox to have a status that the specific mailbox for a specific email address is located at a location outside of its local environment.

* * * * *